Dec. 20, 1960  M. REBUFFONI  2,965,803
ARC WELDING APPARATUS
Filed Oct. 11, 1957  3 Sheets-Sheet 1

WITNESSES:
Bernard R. Gieguny
Leon J. Taza

INVENTOR
MARTIN REBUFFONI
BY
Hymen A Drummond
ATTORNEY

United States Patent Office 2,965,803
Patented Dec. 20, 1960

2,965,803

ARC WELDING APPARATUS

Martin Rebuffoni, Williamsville, N.Y., assignor to Westinghouse Electric Corporation, East Pittsburgh, Pa., a corporation of Pennsylvania Filed Oct. 11, 1957, Ser. No. 689,673

9 Claims. (Cl. 315—174)

This invention relates to the art of arc welding and has particular relation to arc-welding apparatus of the rectifier type.

Apparatus which typifies the teachings of the prior art is disclosed in Croco et al. Patent 2,752,529. This patent discloses rectifier arc-welding apparatus of the polyphase type in which the arc is supplied from a rectifier assembly (22a through 22f, Fig. 5) energized from a transformer (12), the secondary windings of which are each connected in series with variable reactor windings (38) in a delta network. The reactor windings absorb the voltage by which the open circuit potential between the output terminals of the rectifier exceeds the arc drop. The rectifiers (22a through 22f) are disclosed as of the selenium type.

Recently, rectifiers of the silicon and the germanium type have become available. These rectifiers have a low forward resistance and thus low power loss in operation. In addition, these rectifiers have low back-leakage. These rectifiers will be referred to herein as rectifiers of the low-loss type or low-loss rectifiers. Many units of the Croco apparatus have been sold and have given highly satisfactory service. But it has become desirable to provide rectifier arc-welding apparatus including rectifiers of the low-loss type rather than selenium rectifiers because the low-loss rectifiers have properties which dovetail advantageously into the demands of a welding-arc load.

The low-loss rectifiers are advantageous in arc-welding because the efficiency is high and (between 5 and 15% higher than Croco et al.) the heating of the rectifiers is minimized and thus their tendency to fail from overheating is suppressed. In addition, because the forward resistance or forward impedance of these rectifiers is low, the load current supplied through the rectifiers does not produce a high potential drop across the rectifiers. The load current may then be varied over a wide range without changing the terminal potential at the output of the rectifiers. Low-loss rectifiers may then be advantageously incorporated in systems or installations where a number of arc-welds may be produced simultaneously from a common supply, the number being different at different times.

Another advantage arises from the low-leakage property of low-loss rectifiers. In a welding operation the arc has a tendency to become extinguished at irregular intervals. In rectifier arc-welding in which the rectifiers are of the low-loss type such extinction of the arc would because of the low-leakage property cause the potential at the arc supply terminals to rise abruptly to the open circuit magnitude producing a sharp potential impulse which immediately refires the arc. The sharpness of the increase in potential is accentuated by the low forward impedance of the rectifiers which is about one-fourth the forward impedance of selenium rectifiers. The abruptness of the rise in potential is particularly important because the deionization time of the arc is short, and unless the potential rises in a very short time to a firing magnitude, the region between the electrode and the work becomes deionized and the arc is not readily refired.

In rectifier arc-welding apparatus, the rectifier assembly consists of a plurality of rectifier units or cells or cell aggregations. The expression "rectifier unit" as used means a cell or a sufficient number of cells to withstand a given back voltage connected in series.

It is broadly an object of this invention to provide rectifier arc-welding apparatus in which the rectifier units are of the low-loss type.

It is another object of this invention to provide arc-welding apparatus including facilities for supplying a number of arc welds, which may change from time to time, from a common supply and it is a specific object of this invention for providing such apparatus in which the supply is of the rectifier type including low-loss rectifiers.

Attempts to provide rectifier arc-welding apparatus as disclosed in the Croco et al. patent but with low-loss rectifier units have, prior to this invention, proved unsuccessful. Attempts to draw substantial power from such apparatus resulted in the failure of a number of the rectifier units or cells. When the power rating of the apparatus was reduced to a magnitude at which failures did not occur, it was found to be too low for economic operation.

It is accordingly a specific object of this invention to provide rectifier arc-welding apparatus either of the single or multi-operator type including rectifier units of the low-loss type which shall operate at economic power ratings without excessive failures of the units.

This invention arises from the realization that the sporadic failure of rectifier units of the low-loss type in apparatus as disclosed by Croco et al. is caused by the tendency of certain of the units to hog the current. In such apparatus, each of the rectifier assemblies labeled 22a through 22f is made up of a number of parallel connected cells. It has been found that the volt-ampere characteristic of low-loss rectifier units is relatively flat, but different cells have different volt-ampere characteristics. When a potential is impressed across parallel units each having a different characteristic, one of the units draws substantially higher current than the other. It is then necessary either to operate all parallel units at such a low potential that the assembly is uneconomic or to operate the units at a higher potential so that the high current units may be damaged.

In accordance with this invention, the difficulty arising from the non-uniform volt-ampere characteristics of the units is suppressed by connecting in parallel not the rectifier units alone but a plurality of networks each consisting of a rectifier unit and a winding of the supply transformer in series. Each network includes only a transformer winding and not a reactance winding. In this case the volt-ampere characteristic of each series network rather than the characteristic of the rectifier unit alone determines the current conducted by the network and since the series network characteristic is steeper than the rectifier unit characteristic, the differences in the currents conducted by each of a plurality of parallel networks is substantially less than the corresponding differences for the rectifier units. Thus a number of parallel-networks may be energized so that the current supplied through each has a magnitude falling within a narrow range and the operation is economic.

The steepness of the network characteristic is greater the higher the impedance of the winding relative to the impedance of the associated rectifier unit. The impedance of the winding is low, but the impedance of the rectifier units is very low and effective equalizing of the current among the networks is achieved. It is to be realized that such effective equalizing would not result from similar connection of rectifiers of other types than the highly-conducting low-loss rectifier units of the silicon and germanium type because the former have several times the resistance of the latter.

Apparatus in accordance with the specific aspects of this invention includes a supply transformer having a single primary and a plurality of secondaries. The primary has a number of windings corresponding to the phases of the supply from which the apparatus is to be energized. Each of the secondaries also has a number of windings corresponding to the number of phases from the energizing supply. Where the apparatus is to serve the general purposes now served by the Croco apparatus, absorbing reactors are provided, but in this case a reactor is connected to series with each winding of the primary and the supply, and not as in the Croco apparatus in circuit with the secondaries.

In accordance with the specific aspects of this invention, the windings of each secondary are connected in a delta or polygonal network. A pair of rectifier units is associated with each winding of each secondary. The units are so connected to the load conductors through which the work and the electrode are supplied as to impress a direct-current potential on the load conductors. The load conductors are thus supplied by a plurality of networks, each consisting of a secondary and the associated rectifier units. In each case, the impedance of the secondary winding is of sufficient magnitude relative to the forward impedances of the associated rectifier units to prevent the rectifier units from hogging the load current.

It has been found that because of the welding arc characteristics the delta connection just discussed is particularly effective in reliably supplying arc current and in maintaining the arc stable. While the delta circuity is particulary advantageous, it is realized that for certain purposes a star circuit of one type or another may be used. Apparatus embodying such a star connection is regarded within the scope of the broader aspects of this invention.

The novel features considered characteristic of this invention are disclosed generally above. The invention itself both as to its organization and as to its method of operation, together with additional objects and advantages thereof, will be understood from the following description of specific embodiments taken in connection with the accompanying drawings, in which.

Figure 1:
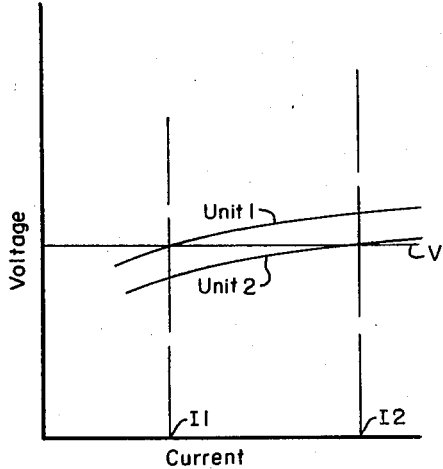
Figure 1 is a graph illustrating the difficulty encountered in the use of rectifier arc-welding apparatus of the prior art with rectifier units of the low-loss type.

Fig. 1 shows the characteristics, labeled unit 1 and unit 2, of a pair of rectifier units of the low-loss type which may be regarded as connected directly in parallel. Volttage is plotted vertically and current horizontally, but the curve of unit 1 passes through higher voltage points than the curve of the other. It is seen that at a voltage V, unit 2 draws substantially higher current I2 than the current I1 drawn by unit 1. It has been found that if the voltage V is maintained such that I2 is within the permissible operational range of unit 1, I1 is so low that the operation is uneconomic and if the voltage V is increased to a magnitude at which unit 1 draws economic current, I2 becomes so high as to damage unit 2.

Figure 2:
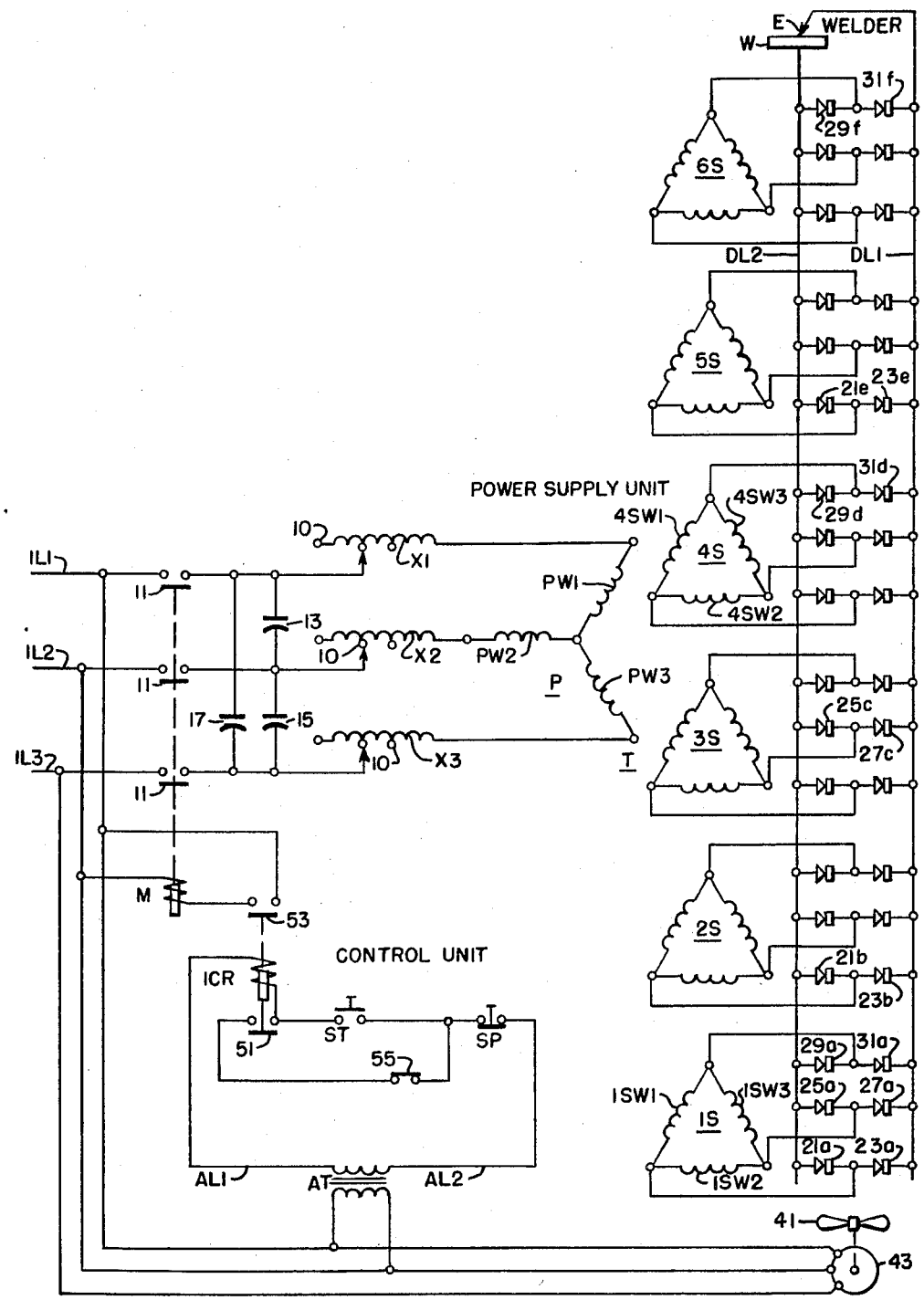
Fig. 2 is a circuit diagram of a preferred embodiment of this invention.

The apparatus in accordance with this invention which does not suffer from this disadvantage is shown in Fig. 2 and includes a welder, a power supply unit, and a control unit. The apparatus is supplied from conductors 1L1, 1L2, 1L3 which are adapted to be connected to the buses of a commercial supply through the usual disconnects or circuit breakers (not shown). Power for the control unit is derivable from the conductors AL1 and AL2 which may be energized from conductors 1L1 and 1L2 through a transformer AT.

The welder includes the usual facilities (not shown) for mounting and moving work W and for maintaining an electcrode E properly placed with reference to the work W so that an arc can be produced between the electrode E and the work W and the electrode or a filler melted to produce a joint in the work.

The power supply unit includes load conductors DL1 and DL2. Conductor DL1 is connected to the work W and conductor DL2 to the electrode E. In the usual practice of this invention, the work W and conductor DL1 may be grounded.

The power supply unit also includes a transformer T having a single primary P, a plurality of secondaries 1S, 2S, 3S, 4S, 5S and 6S and a plurality of variable reactors X1, X2, and X3 corresponding in number to the number of phases of the supply. To vary reactors X1, X2 and X3, the reactors may be provided with taps 10 as shown, or they may be of the variable reluctance type disclosed in the Croco et al. patent. The primary P has windings PW1, PW2 and PW3 connected in star or Y. Each of the secondaries has a corresponding number of windings correspondingly wound which are connected in delta. Thus, the secondary 1S has windings 1SW1, 1SW2 and 1SW3 and the other secondaries have similarly labeled windings. The potentials across windings whose labels have the same last numbers are in phase. Thus the potential across PW1 and 1SW1 through 6SW1 are in phase.

In addition, the unit includes a contactor M having a plurality of main contacts 11 and one or more auxiliary contacts (not shown) which serve the usual purposes (for example, for energizing signal lights) in the use of the apparatus. Conductor 1L1 is adapted to be connected to winding PW1 through reactor X1; 1L2 to winding PW2 through reactor X2; and 1L3 to PW3 through reactor X3. A plurality of power factor correcting capacitors 13, 15, 17 are adapted to be connected between conductors 1L1 and 1L2, 1L2 and 1L3 and 1L3 and 1L1.

The power supply unit also includes a plurality of rectifier units 21a, 23a, 25a, 27a, 29a, 31a through 21f through 31f. These units are of the low-forward-impedance or low-loss type and are preferably silicon or germanium diodes. Each unit may be a single cell or a sufficient number of cells in series to withstand the back voltage.

A pair of rectifier units 21a and 23a, 25a and 27a, and 29a and 31a through 21f and 23f through 29f and 31f is associated with each axes of each secondary 1S through 6S, respectively. Each pair of these units 21a and 23a through 29f and 31f is connected in series between conductors DL1 and DL2. There are thus a number of pairs of rectifier units equal to the total number of windings of the secondaries 1S through 6S connected in parallel between conductors DL1 and DL2. The apices of each of the secondaries are connected to the junctions of the respective pairs of rectifier units associated with the secondary. For example, the apices of 1S are connected to the junctions 21a and 23a, 25a and 27a, and 29a and 31a. Each secondary winding is then connected to impress a direct-current potential between the load conductors DL1 and DL2 through two rectifier units of different pairs when its potential is of one polarity and through the other two rectifiers of the same pair when its potential is of the opposite polarity. Thus, winding 1S1 is connected to a potential such that DL1 is electrically positive relative to DL2 through 23a and 25a when its potential is of one polarity and through 27a and 21a when its potential is of the opposite polarity.

The rectifiers 21a through 31f and to an extent the transformer T are adapted to be cooled by an air stream produced by one or more fans 41, the driving motors 43 of which are connected directly to conductors 1L1, 1L2 and 1L3 to be energized once the conductors are energized independently of the contactor M. Thus, the supply of cooling air before the apparatus is put into operation is assured.

The control unit includes a start switch ST, a stop switch SP and a relay 1CR. The relay 1CR has a pair of normally open contacts 51 and 53. The coil of contactor M is adapted to be connected between conductors 1L1 and 1L2 through one of the normally open contacts 53. The coil of the relay 1CR is adapted to be connected between conductors AL1 and AL2 through the normally open start switch ST and the normally closed stop switch SP. The start switch ST is adapted to be shunted out by the normally open contact 51 of the relay 1CR which is connected across the switch ST through the normally closed contacts 55 of a thermal protective element. The thermal element is usually embedded in a winding of the transformer T so that when the temperature of the transformers rises excessively the contact 55 is opened.

In the stand-by condition of the apparatus, conductors 1L1, 1L2 and 1L3 are energized by the closing of the disconnects or circuit breakers (not shown). The fan motor 43 is then energized and the rectifiers 21a through 31f and the other apparatus is cooled. The start switch ST is open so that relay 1CR is deenergized. Contactor M is deenergized and its contacts 11 are open. Transformer T is then deenergized and there is no potential between the load conductors DL1 and DL2.

In the operation of the apparatus, the electrode E and the work W are properly disposed to produce a weld and connected to conductors DL1 and DL2. The start switch ST is then closed actuating relay 1CR and contactor M. This energizes the transformer T. An arc is then struck between the electrode E and the work W and the welding proceeds. During the welding operation, current is supplied through conductors DL1 and DL2 and the electrode E and the work W through parallel networks each of which includes a secondary and the associated rectifiers. Thus, when the terminal of 1SW1 connected to the junction of one set of rectifier units 21a and 23a is positive electrically relative to the terminal connected to the other set of units 25a and 27a, current flows from the positive terminal through one of the units 23a, conductor DL1, the arc, conductor DL2, the other unit 25a to the other terminal. At the same time, homologous current also flows in parallel through windings 2SW1, 3SW1, 4SW1, 5SW1 and 6SW1 and the associated rectifier units 25b and 27b through 25f and 27f, respectively. In each parallel network, the impedance of a secondary winding is in series with two rectifier units. The units have a very low impedance and the impedance of the secondary winding, though low, is comparable to or higher than the impedance of the units. Thus, the differences in the characteristics of the individual rectifier units in each of the networks do not result in a substantial difference in current conducted through the separate networks and the rectifier units are used economically.

Figure 3:
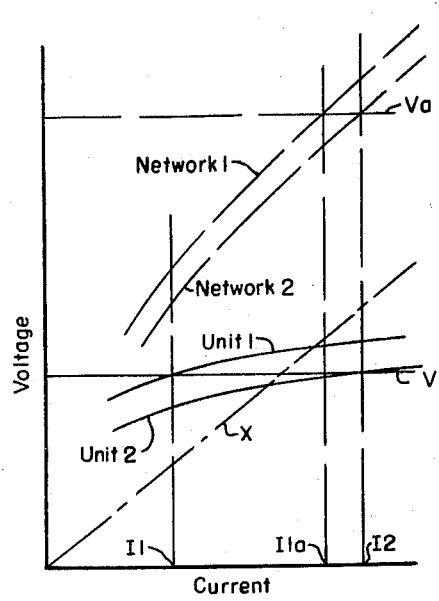
Fig. 3 is a graph illustrating the manner in which apparatus such as this, shown in Fig. 2, overcomes the difficulties involved in parallel operation of rectifier units of the low-loss type.

The operation here involved is illustrated in Fig. 3 which shows the characteristics for a pair of the parallel network, network 1 and network 2, including unit 1 and unit 2, and the manner in which they are derived. Voltage across each branch is plotted vertically and current conducted by each branch horizontally. The characteristics for a typical pair of rectifier units, unit 1 and unit 2, similar to those of Fig. 1, is plotted in full lines. The characteristic X for the secondary winding 1SW1 through 6SW3 of a network is plotted as a dash-dot line. For the purpose of this explanation, the characteristic is assumed to be linear and the same for all windings. The resulting characteristics for each of the networks 1 and 2 is equal to the sum of the secondary winding characteristic and the characteristic of the unit. The resulting characteristic is represented by the broken line curves. It is seen that at any potential Va impressed across both networks the difference between the currents I1a and I2 conducted by the branches is relatively small.

Figure 4:
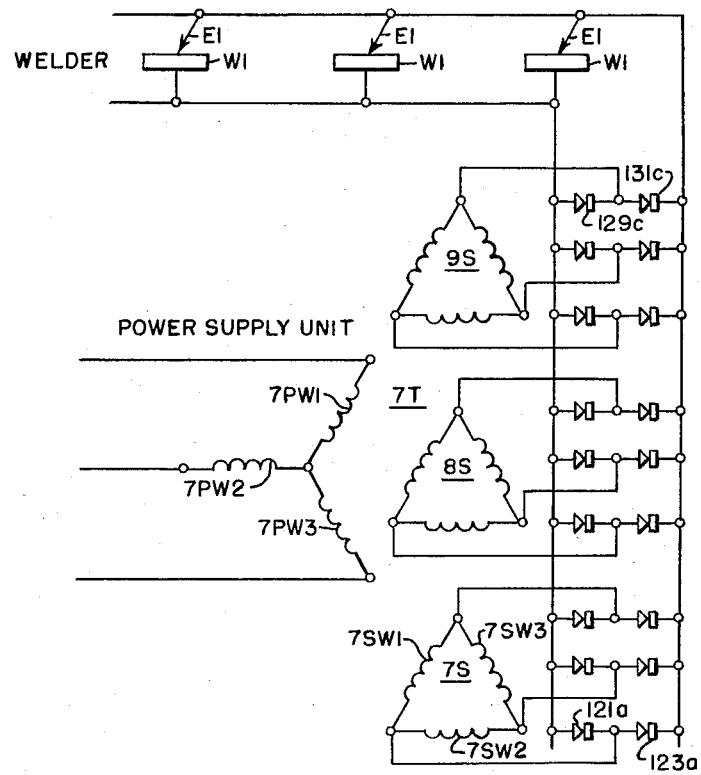
Fig. 4 is a circuit diagram of a multi-operator welder in accordance with this invention.

The apparatus disclosed in Fig. 2 is of the so-called constant current variable-voltage type. In this apparatus, the impedance of the transformer T may be appreciable, and reactors X1, X2 and X3 are provided for absorbing the voltage difference by which the open circuit potential exceeds the arc potential. Apparatus of the so-called constant-potential multi-operator type is also within the scope of the broader aspects of this invention and is shown in Fig. 4. This apparatus includes a transformer 7T of the low-impedance type which is connected directly and not through reactors such as X1, X2 and X3 to supply conductors. The secondary windings 7SW1 through 9SW3 of the secondaries 7S through 9S are of low impedance. The secondaries 7S through 9S supply conductors DL3 and DL4 through low-loss rectifier units 121a through 131c. The impedance of transformer 7T is of the same order or higher than the forward impedances of the individual rectifier units 121a through 131c and the effect described above is produced. A plurality of welders each including an electrode E1 and work W1 are supplied from the conductors DL3 and DL4. Selenium rectifier units have approximately four times the impedance of comparable low-leakage units and a constant potential rectifier welder as just described is not feasible with selenium units.

In the use of the apparatus shown in Fig. 4 operation may take place at any or all of the welders at any time without affecting the others since the potential available between conductors DL3 and DL4 remains substantially independent of the current supplied through these conductors.

Figure 5:
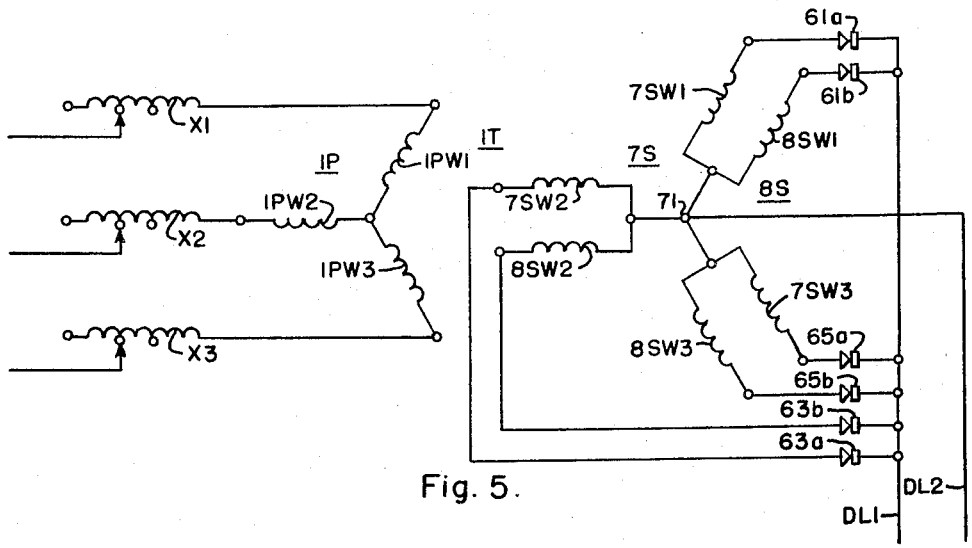
Fig. 5 is a circuit diagram of a modification of this invention involving the concept disclosed in its broader aspects.

Fig. 5 shows a modification of this invention in accordance with its broader aspects. In this case, a transformer 1T having a primary 1P and a plurality of secondaries 7S and 8S is provided. The primary has windings 1PW1, 1PW2 and 1PW3 and each secondary has windings 7SW1, 7SW2, 7SW3, 8SW1, 8SW2, 8SW3 related to the primary windings as in the Fig. 2 modification. The windings 1PW1, 1PW2 and 1PW3 of the primary 1P are connected in star and are adapted to be connected to conductors 1L1, 1L2 and 1L3 through the contacts 11 and reactors X1, X2, X3 as in the embodiment shown in Fig. 2. The secondaries 7S and 8S are connected in star. With each winding 7SW1 through 8SW3, a rectifier unit 61a, 63a, 65a and 61b, 63b, 65b, respectively, is associated. The windings 7SW1 through 8SW3 are connected to the conductor DL1 each through a corresponding rectifier unit 61a through 65b, respectively. The conductor DL2 is connected to the neutral terminal 71 of the secondaries.

In the operation of the apparatus shown in Fig. 5 current is conducted in parallel through each set of in-phase windings, the associated rectifiers, the load and the conductors DL1 and DL2. Thus, when the unconnected terminals of 7SW1 and 8SW1 are positive relative to the neutral terminal, current is conducted in parallel through the branches including the windings 7SW1 and 8SW1 and the associated rectifiers. The effect described in connection with Fig. 3 is thus produced.

It is to be realized that the apparatus disclosed in Fig. 2 is peculiarly adaptable for arc welding and has marked advantages in such use. The apparatus disclosed in Fig. 4 is not so advantageous but falls within the broad scope of this invention.

While preferred embodiments of this invention has been disclosed herein, many modifications thereof are feasible. This invention then is not to be restricted except insofar as is necessitated by the spirit of the prior art.

I claim as my invention:

1. Apparatus for arc-welding work with a welding electrode with power derived from a polyphase supply comprising transformer means having a single primary and a plurality of secondaries, said primary and each secondary having a plurality of windings corresponding in number to the number of phases of said supply, a plurality of voltage absorbing reactors corresponding in number to the windings of said primary, means connecting said reactors and said windings of said primary to said supply, a reactor being connected in series with each primary, means connecting the windings of each of said secondaries in a polygonal network, a first conductor to be connected to said electrode, a second conductor to be connected to said work, a first plurality of rectifier units of the low-loss type associated with each secondary, a second plurality of rectifier units of the low-loss type associated with each secondary, said first and second pluralities corresponding in number to the number of windings of each secondary, means connecting a rectifier unit of said first plurality and a corresponding rectifier unit of said second plurality in series between said first conductor and said second conductor, and means connecting an apex of each secondary to a junction of a corresponding pair of series connected units.

2. Apparatus for arc-welding work with a welding electrode with power derived from a polyphase supply comprising transformer means having a single primary and a plurality of secondaries, said primary and each secondary having a plurality of windings corresponding in number to the number of phases of said supply, a plurality of voltage absorbing reactors corresponding in number to the windings of said primary, means connecting said reactors and said windings of said primary to said supply, a reactor being connected in series with each primary, a first conductor to be connected to said electrode, a second conductor to be connected to said work, a plurality of rectifier units of the low-loss type associated with each secondary, said last-named plurality corresponding in number to the number of windings of each secondary, means connecting each secondary and its associated units in a rectifier network having a first pole of one polarity and a second pole of the opposite polarity, each of said associated units being connected to a corresponding winding of the associated secondary, means connecting said first poles of all said rectifier networks to said work conductor, and means connecting said second poles of all said networks to said electrode conductor.

3. Apparatus for arc-welding work with a welding electrode with power derived from a polyphase supply comprising transformer means having a single primary and a plurality of secondaries, said primary and each secondary having a plurality of windings corresponding in number to the number of phases of said supply, means connecting the windings of each of said secondaries in a polygonal network, a first conductor to be connected to said electrode, a second conductor to be connected to said work, a first plurality of rectifier units of the low-loss type associated with each secondary, a second plurality of rectifier units of the low-loss type associated with each secondary, said first and second pluralities corresponding in number to the number of windings of each secondary, means connecting a rectifier unit of said first plurality and a corresponding rectifier unit of said second plurality in series between said first conductor and said second conductor, and means connecting an apex of each secondary to a junction of a corresponding pair of series connected units, the impedance between said first and second conductors looking towards said rectifier units being as low as practicable.

4. Apparatus for arc-welding a plurality of workpieces with a plurality of welding electrodes with power derived from a polyphase supply comprising transformer means having a single primary and a plurality of secondaries, said primary and each secondary having a plurality of windings corresponding in number to the number of phases of said supply, means connecting the windings of each of said secondaries in a polygonal network, a first conductor to be connected to said electrodes, a second conductor to be connected to said workpieces, a first plurality of rectifier units of the low-loss type associated with each secondary, a second plurality of rectifier units of the low-loss type associated with each secondary, said first and second pluralities corresponding in number to the number of windings of each secondary, means connecting a rectifier unit of said first plurality and a corresponding rectifier unit of said second plurality in series between said first conductor and said second conductor, and means connecting an apex of each secondary to a junction of a corresponding pair of series connected units, the impedance between said first and second conductors looking towards said rectifier units being as low as practicable.

5. Apparatus for arc-welding work with a welding electrode with power derived from a polyphase supply comprising transformer means having a single primary and a plurality of secondaries, said primary and each secondary having a plurality of windings corresponding in number to the number of phases of said supply, corresponding windings of at least two of said secondaries having substantially like volt-ampere characteristics, means connecting the windings of each of said secondaries in a polygonal network, a first conductor to be connected to said electrode, a second conductor to be connected to said work, a first plurality of rectifier units of the low-loss type associated with each secondary, a second plurality of rectifier units of the low-loss type associated with each secondary, said first and second pluralities corresponding in number to the number of windings of each secondary, means connecting a rectifier unit of said first plurality and a corresponding rectifier unit of said second plurality in series between said first conductor and said second conductor, and means connecting an apex of each secondary to a junction of a corresponding pair of series connected units.

6. Apparatus for arc-welding work with a welding electrode with power derived from a polyphase supply comprising transformer means having a single primary and a plurality of secondaries, said primary and each secondary having a plurality of windings corresponding in number to the number of phases of said supply, means connecting the windings of each of said secondaries in a polygonal network, a first conductor to be connected to said electrode, a second conductor to be connected to said work, a first plurality of rectifier diodes of the low-loss type associated with each secondary, a second plurality of rectifier diodes of the low-loss type associated with each secondary, said first and second pluralities corresponding in number to the number of windings of each secondary, means connecting a rectifier diode of said first plurality and a corresponding rectifier diode of said second plurality in series between said first conductor and said second conductor, and means connecting an apex of each secondary to a junction of a corresponding pair of series connected diodes, the impedance between said first and second conductors looking towards said rectifier diodes being as low as practicable.

7. Apparatus for arc-welding work with a welding electrode with power derived from a polyphase supply comprising transformer means having a single primary and a plurality of secondaries, said primary and each secondary having a plurality of windings corresponding in number to the number of phases of said supply, corresponding windings of at least two of said secondaries having substantially like volt-ampere characteristics, means connecting the windings of each of said secondaries in a polygonal network, a first conductor to be connected to said electrode, a second conductor to be connected to said work, a first plurality of rectifier diodes of the low-loss type associated with each secondary, a second plurality of rectifier diodes of the low-loss type associated with each secondary, said first and second pluralities corresponding in number to the number of windings of each secondary, means connecting a rectifier diode of said first plurality and a corresponding rectifier diode of said second plurality in series between said first conductor and said second conductor, and means connecting an apex of each secondary to a junction of a corresponding pair of series connected diodes.

8. Apparatus for supplying direct-current from a polyphase source to a first load conductor and a second load conductor comprising a transformer having a primary and a plurality of electrically interchangeable secondaries each of said secondaries being connected in a polygonal network, a pair of diodes of the low-loss type associated with each apex of each said network, said pairs of diodes of said networks being electrically interchangeable means connecting each of said pair of diodes in series between said first load conductor and said second load conductor so as to conduct positive current from said first load conductor to said second load conductor, and means connecting each said apex to the junction between the associated pair of diodes.

9. Apparatus for supplying direct-current from a polyphase source to a first load conductor and a second load conductor comprising a transformer having a primary and a plurality of electrically interchangeable secondaries each of said secondaries being connected in a star network, each said network having a common terminal and a plurality of separate terminals, a diode of the low-loss type associated with each separate terminal, said diodes of said networks being electrically interchangeable means connecting each said diode between its associated separate terminal and said first conductor, all said diodes being connected so as to conduct current of the same polarity between said first conductor and all said terminals, and means directly connecting said second conductor to the common terminals of all said networks.

References Cited in the file of this patent
UNITED STATES PATENTS

| | | |
|---|---|---|
| 1,961,153 | Lazarus | June 5, 1934 |
| 1,979,660 | Atherton | Nov. 6, 1934 |
| 2,763,811 | Williams | Sept. 18, 1956 |

FOREIGN PATENTS

| | | |
|---|---|---|
| 243,800 | Great Britain | Dec. 4, 1925 |